US010475452B2

(12) United States Patent
Gao

(10) Patent No.: US 10,475,452 B2
(45) Date of Patent: Nov. 12, 2019

(54) VOICE DATA PROCESSING METHOD AND ELECTRONIC APPARATUS

(71) Applicant: Lenovo (Beijing) Co., Ltd., Beijing (CN)

(72) Inventor: Shu Gao, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 0 days.

(21) Appl. No.: 15/937,988

(22) Filed: Mar. 28, 2018

(65) Prior Publication Data

US 2019/0103105 A1    Apr. 4, 2019

(30) Foreign Application Priority Data

Sep. 29, 2017   (CN) .......................... 2017 1 0906332

(51) Int. Cl.
*G10L 15/22* (2006.01)
*G06F 3/16* (2006.01)
*G10L 25/84* (2013.01)
*G11B 20/10* (2006.01)

(52) U.S. Cl.
CPC .............. *G10L 15/22* (2013.01); *G06F 3/165* (2013.01); *G06F 3/167* (2013.01); *G10L 25/84* (2013.01); *G11B 2020/10546* (2013.01)

(58) Field of Classification Search
CPC ......... G10L 15/22; G10L 17/06; G10L 15/00; G10L 15/20; G10L 21/0208; G10L 15/26; G10L 15/06; G09B 19/06; G09G 5/00; H04M 3/42
See application file for complete search history.

(56) References Cited

U.S. PATENT DOCUMENTS

| 6,556,968 B1* | 4/2003 | Shiono .................... G10L 15/20 704/226 |
| 6,871,107 B1* | 3/2005 | Townsend .............. G11B 19/00 369/25.01 |
| 9,947,313 B2* | 4/2018 | Drewes ................. G10L 15/063 |
| 2002/0055844 A1* | 5/2002 | L'Esperance ......... H04M 1/271 704/260 |
| 2010/0315329 A1* | 12/2010 | Previc ..................... G06F 3/012 345/156 |
| 2011/0112837 A1* | 5/2011 | Kurki-Suonio ......... G10L 15/22 704/235 |
| 2012/0041760 A1 | 2/2012 | Kang et al. |
| 2013/0130212 A1* | 5/2013 | Dohring ................. G09B 19/06 434/157 |

(Continued)

FOREIGN PATENT DOCUMENTS

| CN | 101458943 A | 6/2009 |
| CN | 103778925 A | 5/2014 |
| CN | 103778950 A | 5/2014 |

*Primary Examiner* — Mohammad K Islam
(74) *Attorney, Agent, or Firm* — Anova Law Group, PLLC

(57) ABSTRACT

A voice data processing method and an electronic apparatus are provided. The method includes: pausing accepting voice data as recorded or pausing recording the voice data; detecting whether a current environment satisfies a condition for continuing recording the voice data, after pausing accepting the voice data as recorded or pausing recording the voice data; and initiating acceptance of the voice data in response to detecting the condition for continuing the recording is satisfied.

15 Claims, 8 Drawing Sheets

(56) References Cited

U.S. PATENT DOCUMENTS

| | | | |
|---|---|---|---|
| 2015/0032451 A1* | 1/2015 | Gunn | G10L 15/063 704/244 |
| 2016/0064002 A1* | 3/2016 | Kim | G10L 15/22 704/246 |
| 2016/0064008 A1* | 3/2016 | Graham | G10L 21/0208 704/227 |
| 2016/0148615 A1* | 5/2016 | Lee | G10L 15/22 704/275 |
| 2016/0165044 A1* | 6/2016 | Chan | H04M 3/42221 455/413 |
| 2016/0253995 A1* | 9/2016 | Zhou | G10L 15/20 704/233 |

* cited by examiner

VOICE DATA PROCESSING METHOD AND ELECTRONIC APPARATUS

CROSS-REFERENCES TO RELATED APPLICATIONS

This application claims the priority of Chinese Patent Application No. 201710906332.X, filed on Sep. 29, 2017, the entire contents of which are incorporated herein by reference.

FIELD OF THE DISCLOSURE

The present disclosure generally relates to the field of voice technology and, more particularly, relates to a voice data processing method and an electronic apparatus.

BACKGROUND

With the advancement and maturing of the voice technology, various application software supporting voice techniques appear in the market. To ensure accurate response to user's voice instructions, application software may have to be trained by the user's voice prior to use. To improve accuracy of recognizing user's voice, application software may require recording user's voice for multiple times. During recording, disruptions may occur for various reasons. For example, when ambient noise is loud, application software may be unlikely to capture user's voice. In this case, a user may be required to manually pause the voice recording and determine whether to resume the voice recording later. When to resume the voice recording is subject to the user's personal judgment. The user may press a button on a system input interface repeatedly to control the voice recording process and resume the voice recording.

Thus, existing methods of recording user's voice for training purposes may rely on the full participation of the user. Pausing and resuming, etc. may depend on the user's personal judgment, thereby resulting in cumbersome operation. The constant disruptions to the recording of the user's voice may substantially degrade the user's experience.

The disclosed voice data processing method and electronic apparatus are directed to solve one or more problems set forth above and other problems in the art.

BRIEF SUMMARY OF THE DISCLOSURE

One aspect of the present disclosure provides a method. The method includes pausing accepting voice data as recorded or pausing recording the voice data; detecting whether a current environment satisfies a condition for continuing recording the voice data, after pausing accepting the voice data as recorded or pausing recording the voice data; and initiating acceptance of the voice data in response to detecting the condition for continuing the recording is satisfied.

Another aspect of the present disclosure provides an electronic apparatus. The apparatus includes a collector and a processor coupled to the collector. The collector collects and records voice data. The processor pauses accepting the voice data recorded by the collector or pauses the collector for recording the voice data; detects whether a current environment satisfies a condition for continuing recording the voice data, after the processor pauses accepting the voice data or pauses the collector for recording, and initiates acceptance of the voice data in response to detecting the condition for continuing the recording is satisfied.

Other aspects of the present disclosure can be understood by those skilled in the art in light of the description, the claims, and the drawings of the present disclosure.

BRIEF DESCRIPTION OF THE DRAWINGS

To more clearly illustrate the technical solution in the present disclosure, the accompanying drawings used in the description of the some embodiments are briefly described hereinafter. Obviously, the drawings described below are merely some embodiments of the present disclosure. Other drawings may be derived from such drawings by a person with ordinary skill in the art without creative efforts and may be encompassed in the present disclosure.

DETAILED DESCRIPTION

To make the foregoing objectives, features and advantages of the present disclosure clearer and more understandable, the present disclosure will be further described with reference to the accompanying drawings and embodiments. However, exemplary embodiments may be embodied in various forms and should not be construed as limited to the embodiments set forth herein. Rather, these embodiments are provided to fully convey the thorough and complete concepts of the exemplary embodiments to those skilled in the art.

Figure 1:
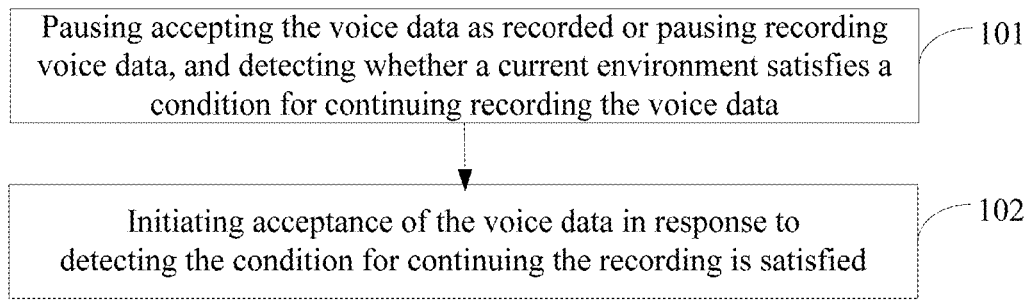
FIG. 1 illustrates a flow chart of an example of a voice data processing method according to some embodiments of the present disclosure.

The present disclosure provides a voice data processing method. FIG. 1 illustrates a flow chart of an example of a voice data processing method according to some embodiments of the present disclosure.

As shown in FIG. 1, at 101, accepting voice data as recorded and/or recording the voice data may be paused. Whether a current environment satisfies a condition for continuing recording may then be detected.

In some embodiments, the voice data may be the voice data spoken by the user and may provide audio data for the application software supporting voice technology to be trained by the user's voice.

In this case, pausing accepting recorded voice data may refer to recording the voice data without accepting the recorded voice data. In other words, after pausing accepting the recorded voice data, the user may continue to speak and generate the voice data. While recording the voice data spoken by the user, the system executing the application software may not accept the recorded voice data, e.g., pausing accepting the recorded voice data. For illustrative purposes, the recorded voice data may be compared with the corresponding text data. Pausing accepting the recorded voice data may also refer to recording the voice data without comparing the voice data with the corresponding text data.

Pausing recording voice data may refer to not recording the voice data by the system. For example, after pausing recording the voice data, the user may continue to speak and generate the voice data, but the system may not record the voice data.

After pausing accepting the recorded voice data or pausing recording the voice data, whether the current environment satisfies a condition for continuing the recording may be determined. The condition for continuing the recording may include whether the noise in the current environment is lower than a threshold or whether a ratio of the voice data over the noise in the current environment satisfies a recognition condition.

The voice data may refer to the user's voice. The noise in the current environment may refer to any audio excluding the user's voice. Characteristics of the noise in the current environment may be different from characteristics of the user's voice in the current environment. For example, the frequency of the noise in the current environment may be different from the frequency of the user's voice in the current environment. Thus, in some embodiments, based on the acoustic characteristics of the current environment, the noise in the current environment may be determined, and whether the noise in the current environment is lower than a threshold may be determined. When lower than the threshold, the noise in the current environment may be substantially small and the condition for continuing the recording may be satisfied.

In other embodiments, whether the ratio of the voice data in the current environment over the noise satisfies a recognition condition may be determined. The recognition condition may be a pre-set ratio value. When the recognition condition is satisfied, the user's voice may be loud enough to be recognized, and the condition for continuing the recording may be satisfied.

The some embodiments are intended to be illustrative, and not to limit the scope of the present disclosure. In other embodiments, the condition for continuing the recording may be whether the voice data in the current environment is greater than another threshold. Whether the voice data in the current environment is greater than another threshold may be determined. When greater than another threshold, the user's voice in the current environment may be recognized and the condition for continuing the recording may be satisfied.

The user's voice, e.g., the voice data, may often be present in the current environment. After the pausing accepting the recorded voice data or pausing recording the voice data, the user may continue to generate the voice data. Thus, the voice data may often be present in the current environment.

As shown in FIG. 1, at 102, in response to detecting the condition for continuing the recoding is satisfied, accepting the recorded voice data may be initiated.

In some embodiments, detecting whether the current environment satisfies the condition for continuing the recording may occur after pausing accepting the recorded voice data. Pausing accepting the recorded voice data may refer to recording the voice data without accepting the voice data. For example, the voice data recording may continue, but the recorded voice data may not be accepted. Accordingly, initiating the acceptance of the recorded voice data may refer to initiating the acceptance of the recorded voice data.

In other embodiments, detecting whether the current environment satisfies the condition for continuing the recording may occur after pausing recording the voice data. Pausing recoding the voice data may refer to not recoding the voice data and not accepting the voice data. Accordingly, initiating the acceptance of the record voice data may refer to initiating the recording and/or accepting the voice data.

Thus, as disclosed, the current environment during recording the voice data may be automatically monitored. When the condition for continuing the recording is satisfied, recording the voice data may be initiated without the need for user's manual participation, thereby simplifying the user's operation. Further, during the pausing, accepting the recorded voice data may be paused without disrupting recording the user's voice, thereby improving the user's experience.

Figure 2:
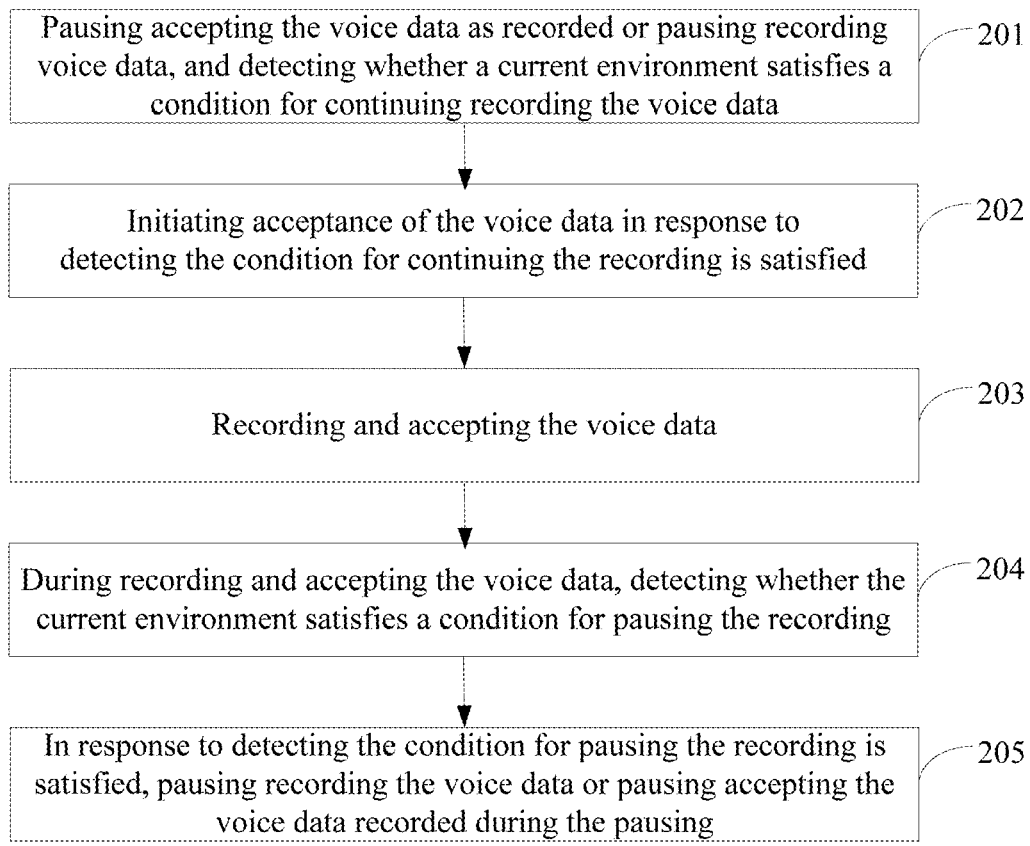
FIG. 2 illustrates a flow chart of another example of a voice data processing method according to some embodiments of the present disclosure.

FIG. 2 illustrates a flow chart of another example of a voice data processing method according to some embodiments of the present disclosure. In some embodiments, as shown in FIG. 2, the method may include the following.

At 201: after pausing accepting the recorded voice data or pausing recording the voice data, detecting whether the current environment satisfies the condition for continuing the recording.

At 202: when the condition for continuing the recording is satisfied, initiating acceptance of the recorded voice data.

For example, 201 and 202 in FIG. 2 may be similar to or consistent with the voice data processing method as shown in FIG. 1.

At 203: recording and accepting the voice data.

For example, the recorded voice data may be accepted such that the application software that supports voice technology may be trained by the user's voice.

At 204: during recording and accepting the voice data, detecting whether the current environment satisfies the condition for pausing the recording.

For example, the condition for pausing the recording may include whether the noise in the current environment is greater than a threshold or whether a ratio of the voice data in the current environment over the noise satisfies the recognition condition.

The voice data may refer to the user's voice. The noise in the current environment may refer to any audio excluding the user's voice. Characteristics of the noise in the current environment may be different from characteristics of the user's voice in the current environment. For example, the frequency of the noise in the current environment may be different from the frequency of the user's voice in the current environment. Thus, in some embodiments, based on the acoustic characteristics of the current environment, the noise in the current environment may be determined, and whether the noise in the current environment is greater than a threshold may be determined. When greater than the threshold, the noise in the current environment may be substantially loud and the condition for pausing the recording may be satisfied.

In other embodiments, whether the ratio of the voice data in the current environment over the noise satisfies a recognition condition may be determined. The recognition condition may be a pre-set ratio value. When the recognition condition is not satisfied, the user's voice may not be loud enough to be recognized, and the condition for pausing the recording may be satisfied.

The embodiments disclosed herein are intended to be illustrative, and not to limit the scope of the present disclosure. In other embodiments, the condition for pausing the recording may be whether the voice data in the current environment is lower than another threshold. Whether the voice data in the current environment is lower than another threshold may be determined. When lower than another threshold, the user's voice in the current environment may not be recognized and the condition for pausing the recording may be satisfied.

At 205: when the condition for pausing the recording is satisfied, pausing recording the voice data or pausing accepting the voice data recorded during the pausing.

For example, when the condition for pausing the recording is satisfied, one action may be used to pause the recording of the voice data, for example, not recording the voice data. Another action may be pausing accepting the recorded voice data, for example, recording the voice data generated by the user without accepting the voice data. In this case, the system may not disrupt the recording by the user. The user may continue to speak the voice data. When the system detects that the current environment satisfies the condition for pausing the recording, the system may automatically pause accepting the voice data.

In the some embodiments, the order of executing 201-203 prior to 203-205 in FIG. 2 is intended to be illustrative and not to limit the scope of the present disclosure. In other embodiments, 203-205 may be executed prior to 201-203 in FIG. 2.

Thus, as disclosed, the current environment during recording the voice data may be automatically monitored. When the condition for continuing the recording is satisfied, recording the voice data may be initiated. When the condition for pausing the recording is satisfied, recording the voice data may pause or accepting the recorded voice data may pause, without the need of the user's manual participation, thereby simplifying the user's operation. Further, during the pausing, accepting the recorded voice data may be paused without disrupting recording the user's voice, thereby improving the user's experience.

In other embodiments, the voice data processing method may include the following after initiating the acceptance of the recorded voice data.

The voice data continued to be recorded may be controlled to follow the voice data recorded prior to the pausing. Or the voice data continued to be recorded and the voice data recorded prior to the pausing may be combined and saved in a same file.

By controlling the voice data continued to be recorded to follow the voice data recorded prior to the pausing, the voice data continued to be recorded and the voice data recorded prior to the pausing may be combined seamlessly.

Saving the voice data continued to be recorded and the voice data recorded prior to the pausing in a same file may include saving the voice data continued to be recorded and the voice data recorded prior to the pausing in one audio file as different segments. For example, one audio file may include the segment of the voice data recorded prior to the pausing and the segment of the voice data continued to be recorded.

Figure 3:
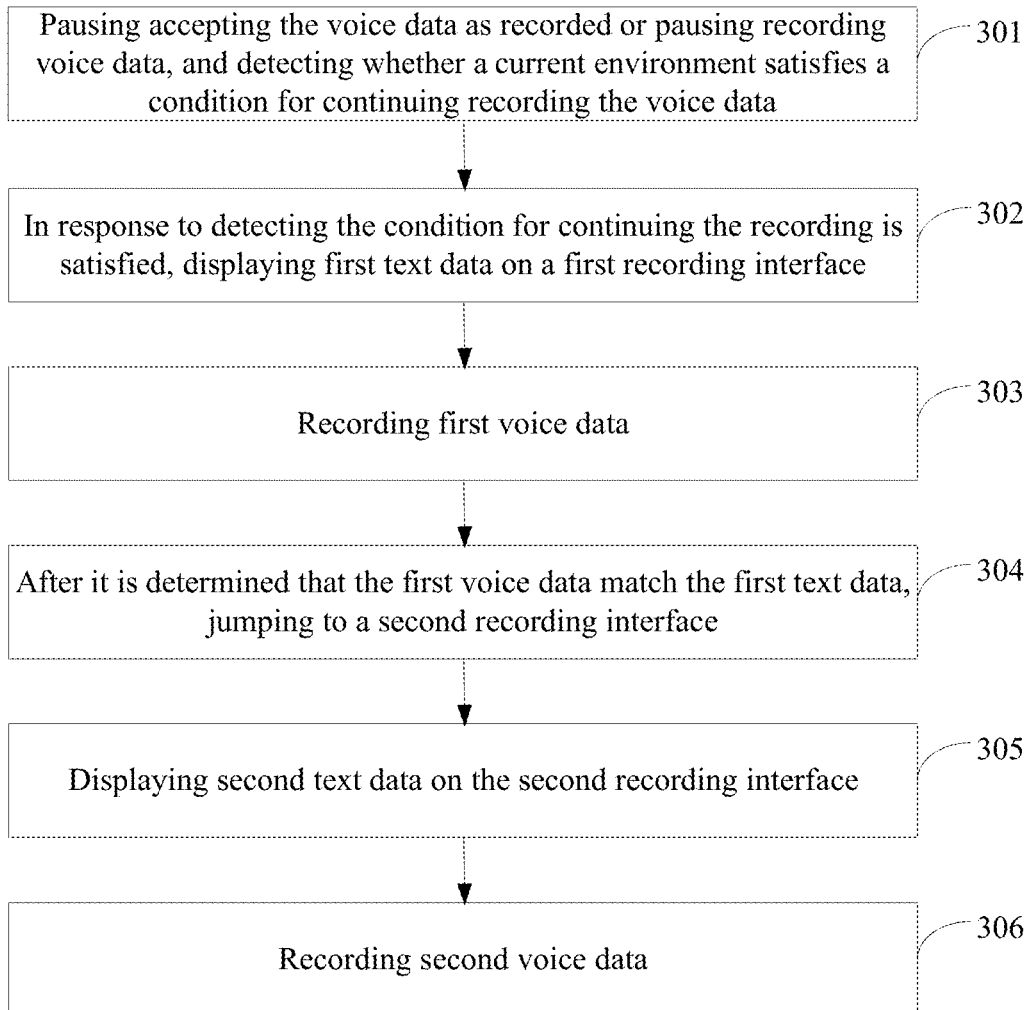
FIG. 3 illustrates a flow chart of another example of a voice data processing method according to some embodiments of the present disclosure.

FIG. 3 illustrates a flow chart of another example of a voice data processing method according to some embodiments of the present disclosure. In some embodiments, as shown in FIG. 3, the method may include the following.

At 301: after pausing accepting the recorded voice data or pausing recording the voice data, detecting whether the current environment satisfies the condition for continuing the recording.

At 302: when the condition for continuing the recording is satisfied, displaying first text data on a first recording interface.

The first text data may refer to the text for prompting the user to input the corresponding voice data, for example, the text of the voice data for training purpose. For example, the first text data may be "Show me the weather".

At 303: recording first voice data.

For example, after the user sees the first text data on the first recording interface, the user may speak the first voice data. The system may record the first voice data and determine whether the first voice data match the first text data.

At 304: after it is determined that the first voice data match the first text data, jumping to a second recording interface.

After it is determined that the first voice data match the first text data, the first voice data corresponding to the first text data may be recorded successfully and a subsequent recording interface may be displayed to the user.

In some embodiments, after it is determined that the first voice data mismatch the first text data, a message may be displayed to notify the user that the first voice data mismatch the first text data and the user has to try again.

At 305: displaying second text data on a second recording interface.

At 306: recording second voice data.

After the second voice data are recorded, whether the second voice data match the second text data may be determined. When it is determined that the second voice data match the second text data, a subsequent recoding interface may be displayed to the user and voice data corresponding to subsequent text data may be recorded. So on so forth. More voice data corresponding to text data may be recorded until all text data are completed.

The first text data may be displayed on the first recording interface and the first voice data may be recorded. After it is determined that the first voice data match the first text data, the second recording interface may be displayed to the user. The second text data may be displayed on the second recording interface and the second voice data may be recorded. Thus, initiating acceptance of the recorded voice data may be achieved.

Figure 4A:
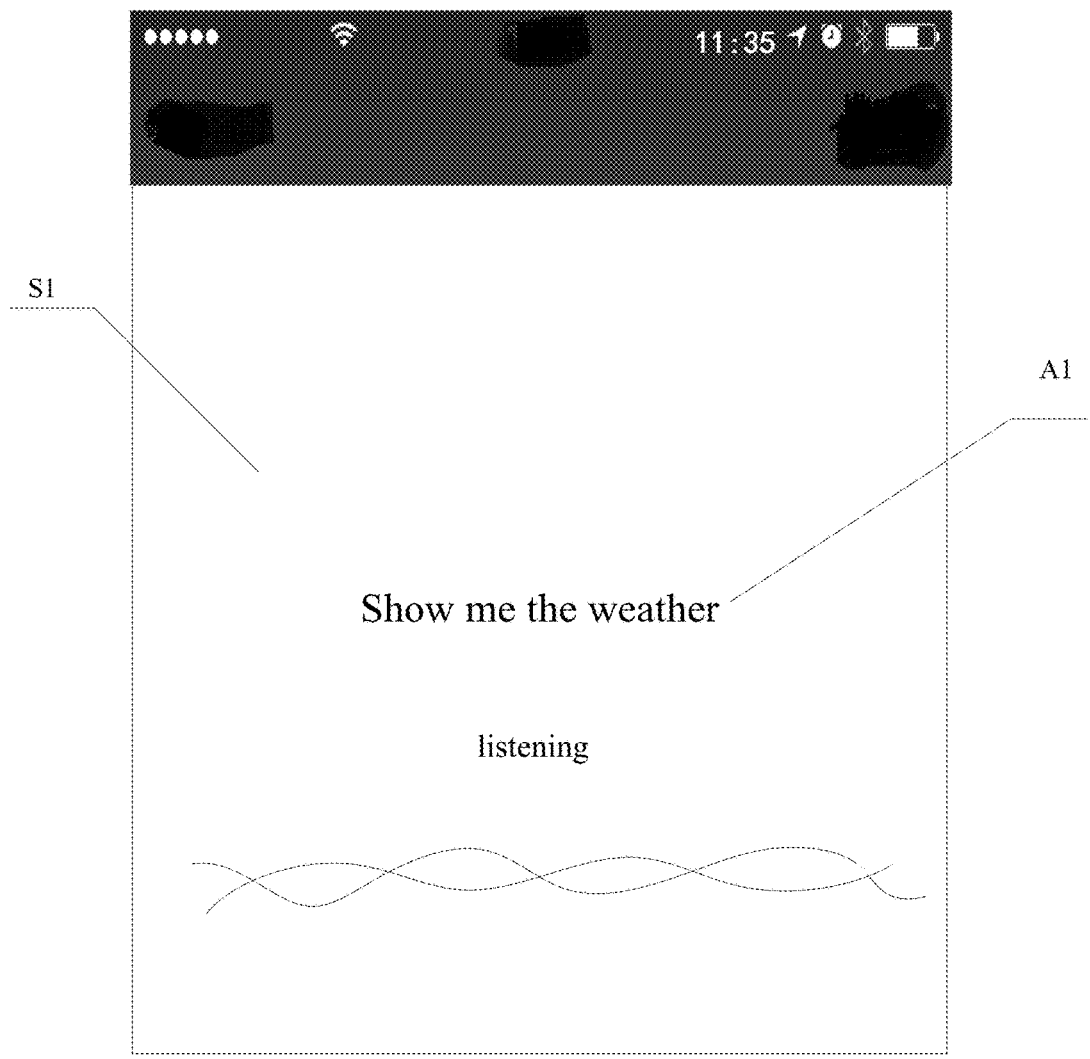
FIG. 4A illustrates a schematic diagram of an example of a first recording interface initiating a recording of voice data according to some embodiments of the present disclosure.
Figure 4B:
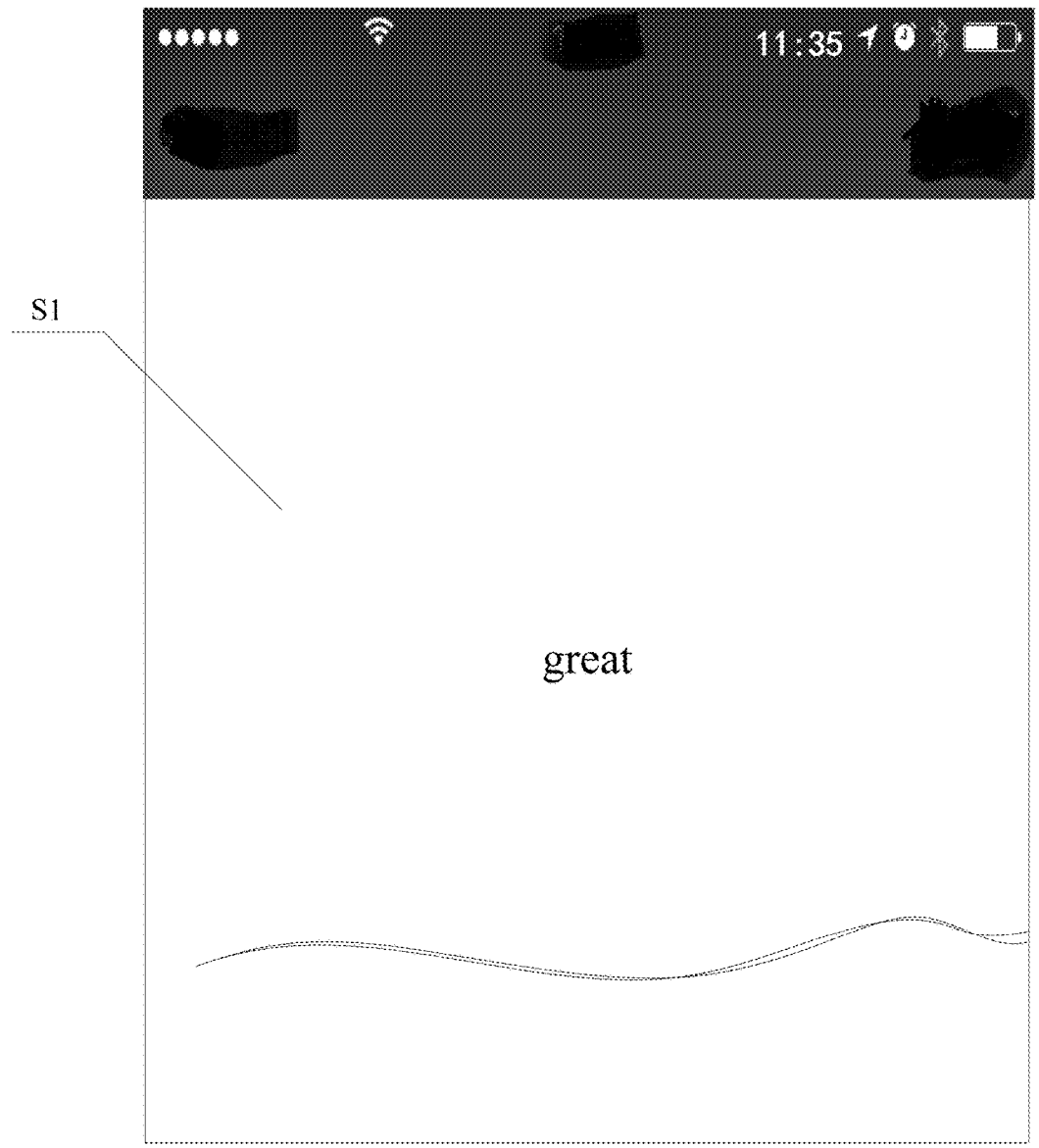
FIG. 4B illustrates a schematic diagram of an example of a first recording interface completing a recording of voice data according to some embodiments of the present disclosure.
Figure 4C:
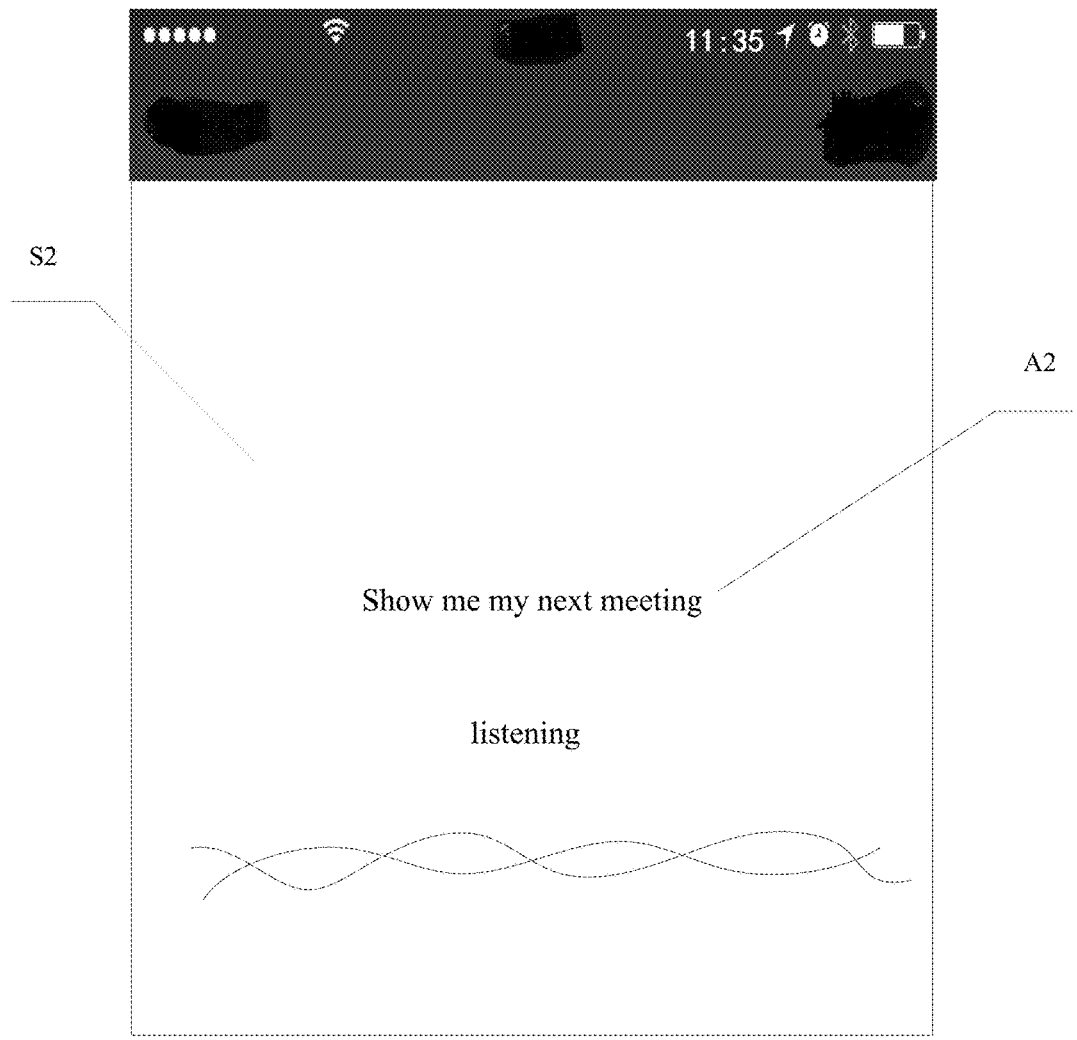
FIG. 4C illustrates a schematic diagram of an example of a second recording interface initiating a recording of voice data according to some embodiments of the present disclosure.

For illustrative purposes, a specific example is provided. FIG. 4A illustrates a schematic diagram of an example of a first recording interface initiating a recording of voice data according to some embodiments of the present disclosure. FIG. 4B illustrates a schematic diagram of an example of a first recording interface completing a recording of voice data according to some embodiments of the present disclosure. FIG. 4C illustrates a schematic diagram of an example of a second recording interface initiating a recording of voice data according to some embodiments of the present disclosure.

As shown in FIG. 4A, the first text data A1, e.g., "Show me the weather", may be displayed on the first recording interface S1. After the first voice data are recorded, whether the first voice data match the first text data may be determined. When it is determined that the first voice data match the first text data, a message may be displayed to notify the user that the voice input matches. As shown in FIG. 4B, a message "great" may be displayed on the first recording interface S1. Then, the second recording interface S2 may be displayed. As shown in FIG. 4C, the second text data A2, e.g., "Show me my next meeting", may be displayed on the second recording interface S2 and the second voice data corresponding to the second text data may be recorded.

Thus, as disclosed, the current environment during recording the voice data may be automatically monitored. When the condition for continuing the recording is satisfied, recording the voice data may be initiated without the need of the user's manual participation, thereby simplifying the user's operation. Further, during the pause, accepting the recorded voice data may be paused without disrupting recording the user's voice, thereby improving the user's experience.

Figure 5:
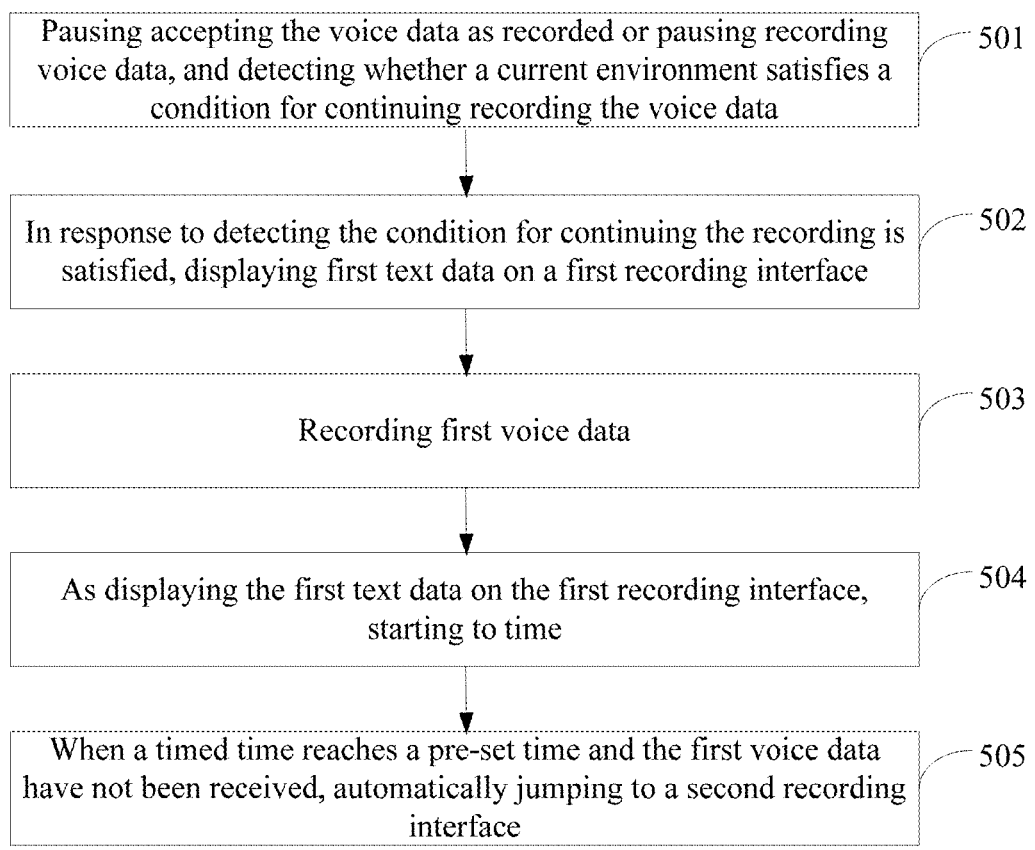
FIG. 5 illustrates a flow chart of another example of a voice data processing method according to some embodiments of the present disclosure.

FIG. 5 illustrates a flow chart of another example of a voice data processing method according to some embodiments of the present disclosure. In some embodiments, as shown in FIG. 5, the method may include the following.

At 501: after pausing accepting the recorded voice data or pausing recording the voice data, detecting whether the current environment satisfies the condition for continuing the recording.

At 502: when the condition for continuing the recording is satisfied, displaying first text data on a first recording interface.

The first text data may refer to the text for prompting the user to input the corresponding voice data, for example, the text of the voice data for training purpose.

At 503: recording first voice data.

For example, after the user sees the first text data on the first recording interface, the user may speak the first voice data. The system may record the first voice data and determine whether the first voice data match the first text data.

At 504: as displaying the first text data on the first recording interface, starting timing.

To efficiently process the voice data and prevent long wait for the user to input voice data, when displaying the first text data on the first recording interface, timing may be started to determine whether a timed time reaches a pre-set time. Before reaching the pre-set time, the voice data may be recorded.

In other embodiments, before reaching the pre-set time and after the first voice data are recorded, whether the first voice data match the first text data may be determined. When it is determined that the first voice data match the first text data, the second recording interface may be displayed, the second text data may be displayed on the second recording interface, and the voice data corresponding to the second text data may be recorded. In other embodiments, before reaching the pre-set time and after the first voice data are recorded, whether the first voice data match the first text data may be determined. When it is determined that the first voice data match the first text data, the second recording interface may be displayed after reaching the pre-set time, the second text data may be displayed on the second recording interface, and the voice data corresponding to the second text data may be recorded.

At 505: when the pre-set time is reached and the first voice data have not been received, automatically jumping to a second recording interface.

When the pre-set time is reached and the first voice data have not been received, to avoid long wait, the second recording interface may be automatically displayed.

Figure 6:
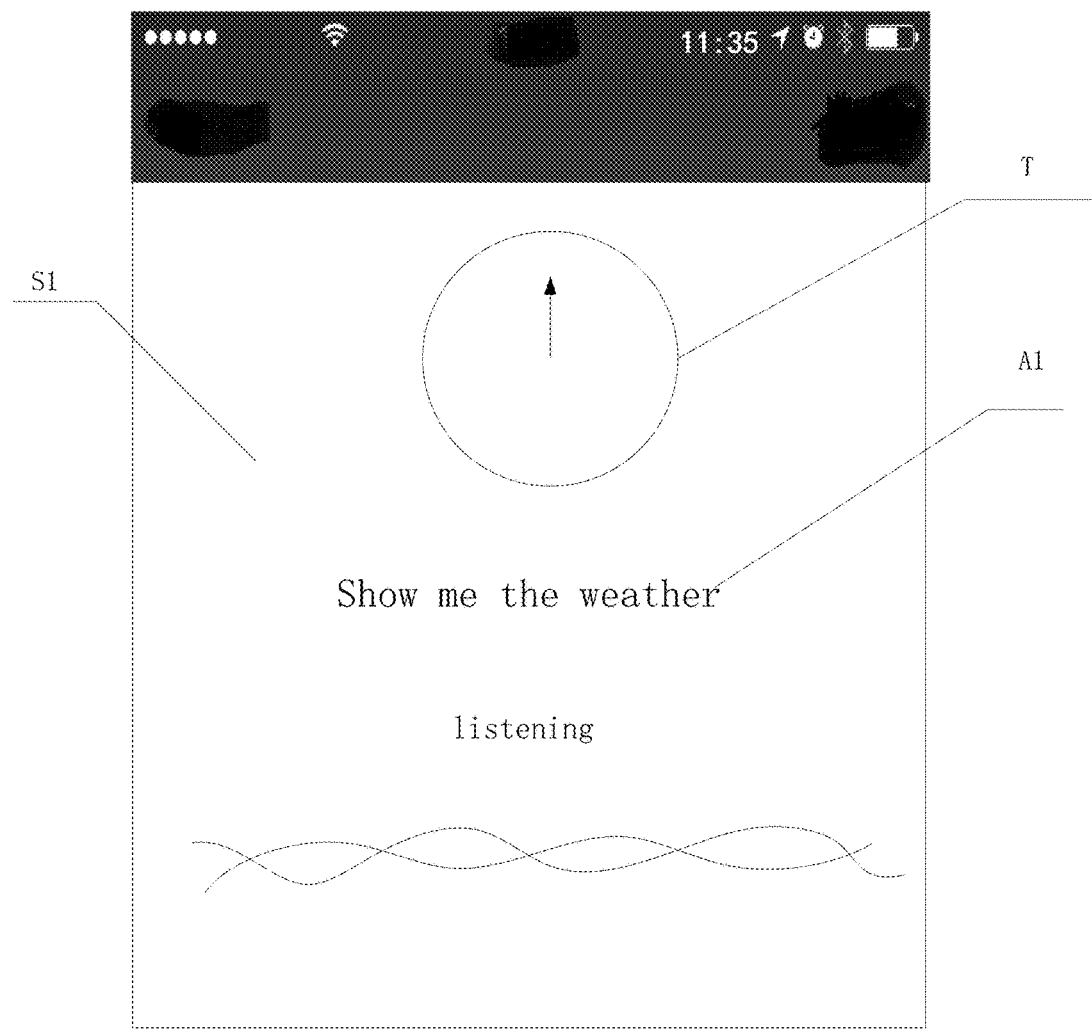
FIG. 6 illustrates a schematic diagram of another example of a first recording interface initiating a recording of voice data according to some embodiments of the present disclosure.

For illustrative purposes, a specific example is provided. FIG. 6 illustrates a schematic diagram of another example of a first recording interface initiating a recording of voice data according to some embodiments of the present disclosure.

As shown in FIG. 6, the first text data A1, e.g., "Show me the weather", may be displayed on the first recording interface S1, and time T may be displayed as well. The time T may start when the first text data A1 are displayed on the first recording interface S1. Before a pre-set time is reached and after the first voice data are recorded, whether the first voice data match the first text data may be determined. When it is determined that the first voice data match the first text data, the second recording interface may be displayed and the voice data corresponding to the second text data may be recorded. When the pre-set time is reached expired and the first voice data have not been received, the second recording interface may be displayed and the voice data corresponding to the second text data may be recorded.

Thus, as disclosed, the current environment during recording the voice data may be automatically monitored. When the condition for continuing the recording is satisfied, recording the voice data may be initiated without the need of the user's manual participation, thereby simplifying the user's operation. Further, during the pausing, accepting the recorded voice data may be paused without disrupting recording the user's voice, thereby improving the user's experience.

The present disclosure also provides an electronic apparatus incorporating the disclosed voice data processing method as illustrated below.

Figure 7:
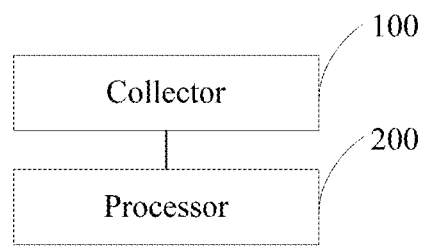
FIG. 7 illustrates a schematic diagram of an example of an electronic apparatus according to some embodiments of the present disclosure.

FIG. 7 illustrates a schematic diagram of an example of an electronic apparatus according to some embodiments of the present disclosure. In some embodiments, as shown in FIG. 7, the electronic apparatus may include a recorder 100 and a processor 200. The recorder 100 may collect and record voice data. For example, the collector 100 may be a voice recorder, e.g., a microphone. The processor 200 may detect whether a current environment satisfies a condition for continuing the recording after pausing accepting the voice data recorded by the collector 100 or pausing recording the voice data by the collector 100. When it is determined that the condition for continuing the recording is satisfied, accepting the recorded voice data may be initiated.

As disclosed, the voice data may be generated by a user and may provide audio data for the application software supporting voice technology to be trained by the user's voice.

Pausing accepting the recorded voice data may refer to recording the voice data without accepting the recorded voice data. In other words, after pausing accepting the recorded voice data, the user may continue to speak and generate the voice data. While recording the voice data spoken by the user, the system executing the application software may not accept the recorded voice data, e.g., pausing accepting the recorded voice data.

Pausing recording the voice data may refer to not recording the voice data by the system. For example, after pausing recording the voice data, the user may continue to speak and generate the voice data, but the system may not record the voice data.

After pausing accepting the recorded voice data or pausing recording the voice data, whether the current environment satisfies the condition for continuing the recording may be detected. The condition for continuing the recording may include whether the noise in the current environment is lower than a threshold or whether a ratio of the voice data over the noise in the current environment satisfies a recognition condition.

The voice data may refer to the user's voice. The noise in the current environment may refer to any audio excluding the user's voice. Characteristics of the noise in the current environment may be different from characteristics of the user's voice in the current environment. For example, the frequency of the noise in the current environment may be different from the frequency of the user's voice in the current environment. Thus, in some embodiments, based on the acoustic characteristics of the current environment, the processor 200 may determine whether the noise in the current environment is lower than a threshold. When lower than the threshold, the noise in the current environment may be substantially small and the condition for continuing the recording may be satisfied.

In other embodiments, the processor 200 may determine whether the ratio of the voice data in the current environment over the noise satisfies another recognition condition. The recognition condition may be a pre-set ratio value. When the recognition condition is satisfied, the user's voice may be loud enough to be recognized, and the condition for continuing the recording may be satisfied.

The some embodiments are intended to be illustrative, and not to limit the scope of the present disclosure. In other embodiments, the condition for continuing the recording may be whether the voice data in the current environment is greater than another threshold. The processor 200 may determine whether the voice data in the current environment is greater than the threshold. When greater than the threshold, the user's voice in the current environment may be recognized and the condition for continuing the recording may be satisfied.

The user's voice, e.g., the voice data, may often be present in the current environment. After the pausing accepting the recorded voice data or pausing recording the voice data, the user may continue to generate the voice data. Thus, the voice data may often be present in the current environment.

The processor 200 may detect whether the current environment satisfies the condition for continuing the recording after pausing accepting the recorded voice data and pausing accepting the recorded voice data may refer to recording the voice data without accepting the voice data. For example, the voice data recording may continue, but the recorded voice data may not be accepted. Accordingly, initiating the acceptance of the recorded voice data by the processor 200 may refer to initiating the acceptance of the voice data by the processor 200.

The processor 200 may detect whether the current environment satisfies the condition for continuing the recording after pausing recording the voice data and pausing recording the voice data may refer to not recording the voice data and not accepting the voice data. Accordingly, initiating the acceptance of the recorded voice data by the processor 200 may refer to initiating the recording and acceptance of the voice data by the processor 200.

Thus, as disclosed, the current environment during recording the voice data may be automatically monitored. When the condition for continuing the recording is satisfied, recording the voice data may be initiated without the need for user's manual participation, thereby simplifying the user's operation. Further, during the pausing, accepting the recorded voice data may be paused without disrupting recording the user's voice, thereby improving the user's experience.

In other embodiments, during recording and accepting the voice data, the processor 200 may detect whether the current environment satisfies the condition for pausing the recording. When the current environment satisfies the condition for pausing the recording, the voice data recording may be paused or the recorded voice data during the pausing may not be accepted.

For example, the condition for pausing the recording may include whether the noise in the current environment is greater than another threshold or whether a ratio of the voice data in the current data over the noise satisfies another recognition condition.

The voice data may refer to the user's voice. The noise in the current environment may refer to any audio excluding the user's voice. Characteristics of the noise in the current environment may be different from characteristics of the user's voice in the current environment. For example, the frequency of the noise in the current environment may be different from the frequency of the user's voice in the current environment. Thus, in some embodiments, based on the acoustic characteristics of the current environment, the processor 200 may determine the noise in the current environment and whether the noise in the current environment is greater than another threshold. When greater than the threshold, the noise in the current environment may be substantially loud and the condition for pausing the recording may be satisfied.

In other embodiments, the processor 200 may determine whether the ratio of the voice data in the current environment over the noise satisfies another recognition condition. The recognition condition may be a pre-set ratio value. When the recognition condition is not satisfied, the user's voice may not be loud enough to be recognized, and the condition for pausing the recording may be satisfied.

The some embodiments are intended to be illustrative, and not to limit the scope of the present disclosure. In other embodiments, the condition for pausing the recording may be whether the voice data in the current environment is lower than another threshold. The processor 200 may determine whether the voice data in the current environment is lower than the threshold. When lower than the threshold, the user's voice in the current environment may not be recognized and the condition for pausing the recording may be satisfied.

When the condition for pausing the recording is satisfied, one action may be pausing recording the voice data, for example, not recording the voice data. Another action may be pausing accepting the voice data recorded during the pausing, for example, recording the voice data generated by the user without accepting the voice data. In this case, the system may not disrupt the recording by the user. The user may continue to speak the voice data. When the system detects that the current environment satisfies the condition for pausing the recording, the system may automatically pause accepting the voice data.

Thus, as disclosed, the current environment during recording the voice data may be automatically monitored. When the condition for continuing the recording is satisfied, recording the voice data may be initiated. When the condition for pausing the recording is satisfied, recording the voice data may pause or accepting the recorded voice data may pause, without the need of the user's manual participation, thereby simplifying the user's operation. Further, during the pausing, accepting the recorded voice data may be paused without disrupting recording the user's voice, thereby improving the user's experience.

In other embodiments, the processor 200 may control the voice data continued to be recorded to follow the voice data recorded prior to the pausing. Or the processor 200 may combine and save the voice data continued to be recorded and the voice recorded prior to the pausing in a same file.

Through controlling the voice data continued to be recorded to follow the voice data recorded prior to the pausing, the voice data continued to be recorded and the voice data recorded prior to the pausing may be combined seamlessly.

Saving the voice data continued to be recorded and the voice data recorded prior to the pausing in a same file may include saving the voice data continued to be recorded and the voice data recorded prior to the pausing in one audio file as different segments. For example, one audio file may include the segment of the voice data recorded prior to the pausing and the segment of the voice data continued to be recorded.

In other embodiments, the processor 200 may initiate the acceptance of the recorded voice data. For example, the processor 200 may display first text data on a first recording interface and record first voice data. After it is determined that the first voice data match the first text data, a second recording interface may be displayed. Second text data may be displayed on the second recording interface and second voice data may be recorded.

The first text data may refer to the text for prompting the user to input the corresponding voice data, for example, the text of the voice data for training purpose. After a user sees the first text data on the first recording interface, the user may speak the first voice data. The system may record the first voice data and determine whether the first voice data match the first text data.

After the processor 200 determines that the first voice data match the first text data, the first voice data corresponding to the first text data may be recorded successfully and a subsequent recording interface may be displayed to the user. After the processor 200 determines that the first voice data mismatch the first text data, a message may be displayed to notify the user that the voice input does not match and the user has to try again.

The first text data may be displayed on the first recording interface and the first voice data may be recorded. After it is determined that the first voice data match the first text data, the second recording interface may be displayed to the user. The second text data may be displayed on the second recording interface and the second voice data may be recorded. Thus, initiating the acceptance of the recorded voice data may be achieved.

In other embodiments, the processor 200 may initiate the acceptance of the recorded voice data. For example, the processor 200 may display the first text data on the first recording interface and record the first voice data. When the first text data are displayed on the first recording interface, the processor 200 may start to time. When a timed time reaches a pre-set time and the first voice data have not been received, the processor 200 may automatically jump to the second recording interface.

To efficiently process the voice data and prevent long wait for the user to input voice data, after the first text data are displayed on the first recording interface, timing may be started to determine whether a pre-set time is reached. Before the pre-set time is reached, the voice data may be recorded.

In other embodiments, before the pre-set time is reached and after the first voice data are recorded, the processor 200 may determine whether the first voice data match the first text data. When it is determined that the first voice data match the first text data, the second recording interface may be displayed, the second text data may be displayed on the second recording interface, and the voice data corresponding to the second text data may be recorded. In other embodiments, before the pre-set time is reached and after the first voice data are recorded, the processor 200 may determine whether the first voice data match the first text data. When it is determined that the first voice data match the first text data, the second recording interface may be displayed after the pre-set time is reached, the second text data may be displayed on the second recording interface, and the voice data corresponding to the second text data may be recorded.

When the pre-set time is reached and the first voice data have not been received, to avoid long wait, the processor 200 may automatically jump to the second recording interface.

The present disclosure provides a voice data processing method and an electronic apparatus to solve technical problems in the existing method that sophisticated and cumbersome operations result in constant disruptions to the recording of the user's voice and degrade the user's experience.

As disclosed, a voice data processing method includes, after pausing accepting recorded voice data or pausing recording voice data, detecting whether a current environment satisfies a condition for continuing recording the voice data; and when the condition for continuing the recording is satisfied, initiating the acceptance of the recorded voice data. Thus, the current environment during the recording of the voice data may be automatically monitored. When the condition for continuing the recording is satisfied, recording the voice data may begin without the need of the user's manual participation, thereby simplifying the user's operation. Further, during the pause, accepting the recorded voice data may be paused without disrupting recording the user's voice, thereby improving the user's experience.

The embodiments disclosed in the present disclosure may be described in a progressive manner. The description of each embodiment may focus on the differentiation as compared to other embodiments. Similarities between various embodiments may be referenced. The description of the electronic apparatus may correspond to the disclosure of the voice data processing method, and may be kept concisely. More details may be referred to the method disclosure.

Various embodiments have been described to illustrate the operation principles and exemplary implementations. It should be understood by those skilled in the art that the present disclosure is not limited to the specific embodiments described herein and that various other obvious changes, rearrangements, and substitutions will occur to those skilled in the art without departing from the scope of the disclosure. Thus, while the present disclosure has been described in detail with reference to the above described embodiments, the present disclosure is not limited to the above described embodiments, but may be embodied in other equivalent forms without departing from the scope of the present disclosure, which is determined by the appended claims.

What is claimed is:

1. A method, comprising:
    pausing accepting voice data as recorded or pausing recording the voice data;
    detecting whether a current environment satisfies a condition for continuing recording the voice data, after pausing accepting the voice data as recorded or pausing recording the voice data; and
    initiating acceptance of the voice data in response to detecting the condition for continuing the recording is satisfied, including:

displaying first text data on a first recording interface;
recording first voice data;
after it is determined that the first voice data match the first text data, jumping to a second recording interface;
displaying second text data on the second recording interface; and
recording second voice data.

2. The method according to claim 1, wherein:
initiating the acceptance of the voice data includes initiating recording of the voice data and initiating the acceptance of the recorded voice data.

3. The method according to claim 1, further including:
recording and accepting the voice data;
during the recording and the accepting of the voice data, detecting whether the current environment satisfies a condition for pausing the recording; and
in response to detecting the condition for pausing the recording is satisfied, pausing the recording of the voice data or pausing the accepting of the voice data recorded during the pausing.

4. The method according to claim 1, wherein the condition for continuing the recording includes one of:
a noise in a current environment is lower than a threshold,
voice data in the current environment is greater than another threshold, and
a ratio of the voice data in the current environment over the noise satisfies a recognition condition.

5. The method according to claim 3, wherein the condition for pausing the recording includes one of:
a noise of a current environment is greater than a threshold,
voice data in the current environment is lower than another threshold, and
a ratio of the voice data in the current environment over the noise dissatisfies a recognition condition.

6. The method according to claim 1, further including:
controlling the voice data continued to be recorded to follow the voice data recorded prior to the pausing; or
saving the voice data continued to be recorded and the voice data recorded prior to the pausing in a same file.

7. The method according to claim 6, wherein:
the voice data continued to be recorded and the voice data recorded prior to the pausing are saved as different segments in the same file including an audio file.

8. The method according to claim 1, wherein initiating the acceptance of the recorded voice data further includes:
after it is determined that the first voice data mismatch the first text data, displaying a message to notify the user that the first voice data mismatch the first text data.

9. A method, comprising:
pausing accepting voice data as recorded or pausing recording the voice data;
detecting whether a current environment satisfies a condition for continuing recording the voice data, after pausing accepting the voice data as recorded or pausing recording the voice data; and
initiating acceptance of the voice data in response to detecting the condition for continuing the recording is satisfied, including:
displaying first text data on a first recording interface;
recording first voice data;
in response to displaying the first text data on the first recording interface, starting time; and
in response to that a timed time reaches a pre-set time and the first voice data have not been received, automatically jumping to a second recording interface.

10. The method according to claim 9, wherein that the first voice data have not been received includes one of:
the first voice data have not been recorded, and
the recorded first voice data mismatch the first text data.

11. An electronic apparatus, comprising:
a collector, wherein the collector collects and records voice data; and
a processor coupled to the collector, wherein the processor:
pauses accepting the voice data recorded by the collector or pauses the collector for recording the voice data;
detects whether a current environment satisfies a condition for continuing recording the voice data, after the processor pauses accepting the voice data or pauses the collector for recording; and
initiates acceptance of the voice data in response to detecting the condition for continuing the recording is satisfied, including:
displaying first text data on a first recording interface;
recording first voice data;
after it is determined that the first voice data match the first text data, jumping to a second recording interface;
displaying second text data on the second recording interface; and
recording second voice data.

12. The apparatus according to claim 11, wherein:
the processor detects whether the current environment satisfies a condition for pausing the recording during recording and accepting the voice data; and
in response to detecting the condition for pausing the recording is satisfied, the processor pauses recording the voice data or pauses accepting the voice data recorded during the pausing.

13. The apparatus according to claim 11, wherein the condition for continuing the recording includes one of:
a noise in a current environment is lower than a threshold,
voice data in the current environment is greater than another threshold, and
a ratio of the voice data in the current environment over the noise satisfies a recognition condition.

14. The apparatus according to claim 12, wherein the condition for pausing the recording includes one of:
a noise of a current environment is greater than a threshold,
voice data in the current environment is lower than another threshold, and
a ratio of the voice data in the current environment over the noise dissatisfies a recognition condition.

15. The apparatus according to claim 11, wherein:
the processor controls the voice data continued to be recorded to follow the voice data recorded prior to the pausing; or
the processor saves the voice data continued to be recorded and the voice data recorded prior to the pausing in a same file.

* * * * *